United States Patent  [15] 3,692,871
Baer  [45] Sept. 19, 1972

[54] GRAFTING OF VINYL HALIDE AND LONG CHAIN ALIPHATIC VINYL MONOMERS ONTO A RUBBER-MODIFIED VINYL HALIDE GRAFT COPOLYMER

[72] Inventor: Massimo Baer, 49 Eunice Drive, Longmeadow, Mass. 01106

[22] Filed: May 15, 1970

[21] Appl. No.: 37,881

Related U.S. Application Data

[63] Continuation-in-part of Ser. No. 669,386, Sept. 21, 1967, abandoned.

[52] U.S. Cl.................260/878 R, 260/879, 260/884
[51] Int. Cl..........................C08f 15/40, C08f 45/68
[58] Field of Search..........................260/878 R, 884

[56] References Cited

UNITED STATES PATENTS

| | | | |
|---|---|---|---|
| 3,644,584 | 2/1972 | Fryd et al. | 260/879 |
| 3,580,975 | 5/1971 | Rademacher | 260/878 R |
| 3,373,228 | 3/1968 | Glazer et al. | 260/884 |
| 3,475,361 | 10/1969 | Garner | 260/884 |
| 3,157,713 | 11/1964 | Leese | 260/884 |
| 3,074,905 | 1/1963 | Douglas | 260/884 |

*Primary Examiner*—James A. Seidleck
*Assistant Examiner*—A. Moller
*Attorney*—John W. Klooster, James C. Logomasini, Richard W. Sternberg and Neal E. Willis

[57] ABSTRACT

There is disclosed a process for the preparation of graft copolymers of a vinyl halide and a long-chain aliphatic vinyl monomer. In accordance with the process, an aqueous dispersion is formed of a preformed rubber-modified vinyl halide graft copolymer, a vinyl halide monomer and a long-chain aliphatic monomer capable of copolymerizing with the vinyl halide monomer. Copolymerization of said monomers is the presence of the aqueous dispersion of the preformed graft polymer leads to a polymeric particle whose shell contains a major proportion of the polymeric long-chain aliphatic monomer and whose core is essentially devoid of this monomer. This preferential concentration of a lubricating monomer on the outer shell of the product particle leads to greatly improved toughness under conditions of high shear.

10 Claims, No Drawings

GRAFTING OF VINYL HALIDE AND LONG CHAIN ALIPHATIC VINYL MONOMERS ONTO A RUBBER-MODIFIED VINYL HALIDE GRAFT COPOLYMER

RELATED APPLICATION

This application is a continuation-in-part of my copending U.S. application, Ser. No. 669,386 (HP-72), filed Sept. 21, 1967, now abandoned.

BACKGROUND

Although rubber-modified vinyl halide polymers which are currently available exhibit many desirable properties, they are oftentimes rather difficult to process and commonly lose toughness under conditions of high shear (such as occur in extrusion molding operations, and the like,) so that product molded articles are, when not modified, rough and brittle. To overcome these deficiencies, various added lubricants or plasticizers have been used in the past with varying degrees of success.

In order to provide improved lubricity and toughness under high shear so-called "external lubricants" have often been used. These are materials which are incorporated into the polymer after it is formed, such as the waxes, etc., and they are generally quite incompatible with the base resin. This factor imposes a limitation upon the maximum amount of such an additive that can be used, since inclusion of the amounts necessary to provide desirable levels of lubricity (or plasticity) results in a great tendency for exudation or plating-out of the material. In addition, the external plasticizers are frequently detrimental to clarity and chemical resistance of the resins in which they are utilized. Frequently, only modest improvements in toughness under high shear are achieved. Accordingly, the use of such additives has resulted in difficulties, particularly when used in amounts greater than about 1 per cent, due largely to the plating-out phenomenon.

Although "internal plasticizers" (i.e. compounds copolymerized with the monomers forming the base resin) have heretofore been proposed for vinyl halide polymers, they typically display a tendency to induce significant undesirable reductions in the glass transition temperature and/or in the resin tensile strength properties after exposure to high shear processing conditions. In addition, such prior art approaches have not usually provided the high levels of lubricity (or low levels of melt viscosity) and of product smoothness which are important for many applications. Moreover, such prior art internal plasticizers have tended to produce undesirable high levels of "puff-up" in extruded materials, i.e. excessive extrudate swelling.

Accordingly, it is an object of the present invention to provide rubber-modified vinyl halide polymers having improved toughness under (and after exposure to) conditions of high shear and which can also exhibit smoothness, low melt viscosity, minimized loss in glass transition temperature uniformity, no tendency to plate out and minimized extrudate puff-up in molded and extruded structures.

Another object is to provide novel processes wherein the foregoing objects are attained conveniently, economically and without substantially increasing the time required for reaction cycles over those necessary for the production of unmodified vinyl halide polymers.

SUMMARY

The present invention is directed to a process for making a vinyl halide polymer which involves as an initial step the forming of an aqueous dispersion. This dispersion comprises water and, as reactants, (on a total 100 parts by weight basis) from about 40 to 80 parts by weight of rubber-modified vinyl halide polymer particles ranging in average cross-sectional dimension from about 0.05 to 150 microns, and from about 20 to 60 parts by weight of a monomer mixture comprising (on a 100 weight per cent total mixture basis) from about 70 to 98 weight per cent vinyl halide monomer, and the balance up to 100 weight per cent of any given such mixture being at least one long-chain aliphatic vinyl compound.

The rubber-modified vinyl halide polymer particles comprise on a 100 weight per cent total basis at least about 58 weight per cent of a polymerized vinyl halide, up to about 24 weight per cent of a copolymerized ethylenically unsaturated aliphatic monomer having a molecular weight under about 100, and from about 3 to 18 weight per cent of a rubber.

The long-chain aliphatic vinyl compounds are characterized by the general formula:

(I) 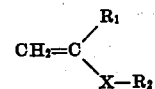

where $R_1$ is hydrogen or methyl, $R_2$ is an aliphatic radical containing from eight through 22 carbon, and X is

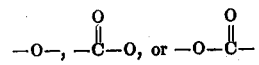

The next process step involves subjecting the so-formed aqueous dispersion to polymerization conditions for a period of time sufficient to polymerize at least a substantial portion of the polymerizable monomers present therein.

Finally, in a last processing step, one recovers the resulting polymeric product by any conventional means, e.g. spray drying, agglomeration, precipitation, etc.

The present invention is further directed to a rubber-modified vinyl halide polymer which is produced by the foregoing process and which is characteristically initially in the form of discrete particles. Each individual such particle has both a core portion and a shell portion which are integral with one another. A core portion ranges in average cross-sectional size from about 0.05 to 160 microns, and a core composition is as above described.

A shell portion has a different composition from that of the core portion and comprises typically from about 2 to 30 weight per cent of at least one polymerized long-chain aliphatic vinyl compound, with the balance up to 100 weight per cent of any given shell composition being at least one copolymerized vinyl halide. The weight ratio of a shell portion to a core portion ranges from about 0.20:1 to 1.50:1. The long-chain aliphatic vinyl compound in the shell portion is as defined above.

DETAILED DESCRIPTION

Core Portion Polymer

As indicated, a core portion polymer comprises a rubber-modified vinyl halide graft copolymer which, as indicated above, contains polymerized vinyl halide, rubber, and, optionally at least one other ethylenically unsaturated monomer.

Such rubber-modified vinyl halide polymers are well known. The vinyl halide monomers which are generally suitable for use in such a polymer include vinyl chloride (preferred) vinyl bromide, and vinyl fluoride. At least one such vinyl halide monomer is polymerized either alone with rubber or in combination with at least one other ethylenically unsaturated compound. In the case of a copolymer with another ethylenically unsaturated compound, the amount of such comonomer generally does not exceed about 24 per cent of the weight of the resulting rubber-modified vinyl halide graft copolymer, and preferably, the amount of such component is less than about 15 per cent of the product.

Ethylenically unsaturated monomers which may be interpolymerized with the vinyl halides typically have molecular weights under about 100 and include vinylidene halides, such as vinylidene chloride; vinyl esters of monobasic organic acids containing 1-8 carbon atoms, such as vinyl acetate; acrylic and alpha-alkyl acrylic acids, such as acrylic and methacrylic acids; the alkyl esters of such acrylic and alkyl-acrylic acids containing one to eight carbon atoms such as methyl acrylate, ethyl acrylate, butyl acrylate, hexyl acrylate and the corresponding methyl methacrylate esters; dialkyl esters of dibasic organic acids in which the alkyl groups contain about 2–5 carbon atoms, such as dibutyl fumarate, diethyl maleate, etc.; amides of acrylic and alkyl-acrylic acids, such as acrylamide, methacrylamide; unsaturated nitriles, such as acrylonitrile, methacrylonitrile, ethacrylonitrile; vinyl alkyl ethers and ketones such as vinyl methyl ether, 2-ethyl hexyl vinyl ether, etc. and various other ethylenically unsaturated compounds copolymerizable with the vinyl halides. Mixtures of compounds exemplified by the foregoing materials may also be used.

The rubber which may be used to prepare a core portion polymer is characterized generally as having:

A. a degree of unsaturation which is under about 5 mol per cent double bonds, as determined, for example, by the iodine monochloride titration method (and preferably under about 2.5 per cent), B. a dispersability (inclusive both of dissolution and colloidal dispersion) in liquid vinyl chloride monomer of at least about 3 parts by weight per 100 of vinyl chloride monomer at 50° C., and C. a glass phase transition temperature below about 0°C. (and preferably below about −25° C.).

Such rubbers are preferably olefinic, such as polyethylene, chlorinated polyethylene, chlorosulfonated polyethylene, ethylene/acrylate copolymers, ethylene/propylene copolymers, ethylene/propylene/diene terpolymers, ethylene/vinyl acetate copolymers, etc. Acrylate rubbers, such as those of n-butyl acrylate (including copolymers with a small amount of an unsaturated diene monomer, or the like) can be employed. Highly unsaturated rubbers, such as dienes, are normally undesirable because of the adverse effect upon polymerization rate. If so desired, mixtures of such rubbers may be employed. In addition to incorporating a rubber in the vinyl halide polymer phase, the monomer formulation may include up to about 15.0 per cent by weight of such a rubber, and preferably less than about 10.0 per cent by weight of the formulation.

The method used to prepare a rubber-modified vinyl halide resin may be any which is commonly practiced in the art such as en masse, in suspension or emulsion. From the standpoint of economics and process control, highly suitable polymers for the core portion can be prepared by a method in which the monomer reactants are suspended in water. In general, the conditions used to prepare the core portion should be such that at least 20 per cent of the rubber used is chemically incorporated into structure of the product graft copolymer.

Preferred rubber-modified vinyl halide polymers have chlorine contents ranging from about 45.0 to 56.7 and have molecular weights such that a 0.4 weight per cent solution of such polymer in cyclohexanone at 25° C. has a specific viscosity of from about 0.3 to 0.6. More preferred specific viscosities range from about 0.35–0.50.

Shell Portion Polymer

As indicated, a shell portion polymer comprises a vinyl halide polymer which is modified by the incorporation thereinto of a long-chain aliphatic vinyl compound in specified amounts.

Structurally, the shell is an integral part of the entire product particle, and should not be considered as separated from the core by a distinct and sharp compositional boundary. Extremely small quantities of long-chain aliphatic monomer possibly may be in the core portion of a product polymer due to slight swelling of the preformed core by the monomers in the starting dispersion used to prepare the product polymer. On polymerization, therefore, one may obtain some long-chain aliphatic monomer polymerized into the core portion.

A shell portion may contain polymeric chains which are chemically attached (i.e. grafted) to the preformed inner core.

Product particles of this invention are tough under conditions of high shear, lubricious, display low levels of melt viscosity, and have high molded body surface smoothness, as compared, for example, to core polymer portions only similarly processed.

The Long-Chain Aliphatic Vinyl Monomer

As indicated, a long-chain aliphatic vinyl monomer of formula (I) incorporates one long-chain aliphatic component, one vinyl component of the structure

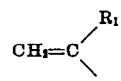

(where $R_1$ is as defined above), and an intermediate, interconnecting linkage which activates the vinyl group, namely, an ether or an ester linkage (e.g.

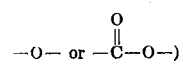

Thus, as used herein, the term "long-chain aliphatic vinyl monomer" refers to esters and ethers having a vinyl component and a long-chain aliphatic component.

To achieve the desired product characteristics, it is has been found to be necessary that a long-chain aliphatic vinyl monomer possess as its long-chain aliphatic component a radical which is essentially incompatible with the base resin, i.e., one having from about eight through 22 carbon atoms, and preferably from about 12 through 18 carbon atoms. The aliphatic radical should have at least eight carbon atoms in the chain since it is found that the degree of lubricity desired is not achieved when the radical is shorter. On the other hand, aliphatic chains containing more than 18 carbon atoms tend to be less desirable since the longer chain compounds frequently retard the rate of reaction although compounds containing aliphatic radicals having up to 22 carbon atoms are also useful in some circumstances. Preferably such long-chain aliphatic radical is an alkyl radical.

The vinyl component should not include an aromatic ring structure directly attached thereto since such a ring structure is known to retard the polymerization rate of vinyl halides. However, any of a very wide variety of vinyl compounds can be used to practice the present invention.

Thus, one class of long-chain aliphatic vinyl monomers suitable for use in the present invention is characterized by the general formula:

(II) 

where $R_2$ is an aliphatic radical (preferably an alkyl radical) containing from about eight to 22 carbon atoms (preferably from about 12 to 18 carbon atoms).

Exemplary compounds of formula (II) include alkyl vinyl ethers, such as lauryl vinyl ether, myristyl vinyl ether, cetyl vinyl ether (preferred), stearyl and the like.

Another class of long-chain aliphatic vinyl monomers suitable for use in the present invention is characterized by the general formula:

(III) 

where $R_3$ is an aliphatic radical (preferably an alkyl radical) containing from about eight to 22 carbon atoms (preferably from about 12 to 18 carbon atoms).

Exemplary compounds of formula (III) include vinyl esters of long-chain acids, such as caprylic, capric, lauric, myristic, palmitic, and the like.

Another class of long-chain aliphatic vinyl monomers suitable for use in the present invention is characterized by the general formula:

(IV) 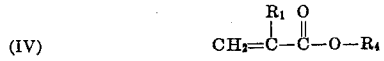

where $R_1$ is hydrogen or methyl, and $R_4$ is an aliphatic radical (preferably an alkyl radical) containing from about 8 to 22 carbon atoms (preferably from about 12 to 18 carbon atoms).

Exemplary compounds of formula (IV) include alkyl esters of acrylic acid, such as lauryl, stearyl, cetyl, and the like.

The amount of such monomer that is employed in a product will generally be about 2.0 to 30.0 per cent, and preferably about 3.0 to 25.0 per cent, based upon the total shell weight. It is generally found that use of an amount of long-chain aliphatic vinyl monomer less than about 2.0 per cent is quite ineffective. On the other hand using more than about 30.0 per cent may result in over lubrication and a relatively undesirable product.

Either a single long-chain aliphatic vinyl monomer or a mixture of two or more such monomers can be used. In some instances, it is preferable to utilize a combination of such monomers since it is found that, although the vinyl halide and a single long-chain aliphatic vinyl monomer may be present simultaneously, the distribution thereof is not homogeneous due to differences in the reactivity thereof. By using two such modifying monomers, one of which has a faster reaction rate and the other of which has a slower reaction rate than the vinyl halide monomer, a relatively uniform distribution of vinyl halide and modifying monomer can be produced in the exterior portion of the product particles.

The Polymerization Process

Although the process of this invention may utilize a preformed vinyl halide polymer phase (core) prepared separately and introduced into the reactor concurrently with the vinyl halide monomer formulation, the preferred processes utilize the same reactor to generate the polymer core phase and then add the long-chain aliphatic vinyl monomer and any additional vinyl halide to the reactor to produce a shell. In other words, a vinyl halide monomer formulation which is free from the long-chain aliphatic vinyl monomer is partially polymerized to generate the polymer core phase prior to introduction of the long-chain aliphatic vinyl monomer.

Although any aqueous dispersion technique may be utilized in accordance with the present invention, processes in which the shell polymerization reaction is effected in suspension are preferred. The amount of water which is charged to the reaction vessel is generally that which will result in the maximum utilization of reactor volume consistent with a sufficiently low slurry viscosity to maintain adequate heat transfer, etc. Accordingly, the amount of water will generally be about 65 to 250 parts by weight per 100 parts of total monomer charged.

In the preferred suspension polymerization process, the water and suspending agent are charged in an agitated vessel which is then sealed and purged of oxygen, such as with a vacuum and/or an inert gas. Thereafter a polymerizable vinyl halide monomer formulation is dispersed in the water and a suitable initiator is added. If necessary, the dispersion is then heated to polymerization temperatures, usually about 25° to 100° C. and preferably 40° to 65° C. to polymerize about 40 to 80 per cent, and preferably 55 to 75 per cent, of the polymerizable monomers present in the formulation. This polymerization usually requires two to eight hours and is preferably completed in about two to 5 hours. At this point, a vinyl halide polymer phase is dispersed in the aqueous reaction medium.

The long-chain aliphatic vinyl monomer preferably is next introduced into the reaction vessel and this may be done without interruption of the polymerization reaction. Alternatively, the polymerization vessel may be vented and cooled and thereafter recharged with the desired monomers and any portion of the original polymerizable monomer formulation that may have been removed in the venting step. Polymerization is then allowed to continue for an additional period of time necessary to polymerize at least a substantial portion of the polymerizable monomers ultimately present in the mixture. Polymerization for about 3 to 20 hours is required to complete the reaction, but preferably the polymerization should be completed in less than eight hours. This, of course, depends upon the degree of conversion desired, but, as a practical matter, 88.0 to 98.0 per cent conversion of monomer is preferred. The time required to carry the reaction to higher levels of completion is generally not warranted when all factors are considered. Residual monomer may be removed and the resin particles recovered in a conventional manner, depending upon the aqueous polymerization technique employed.

The polymerization reaction may be initiated and accelerated by heat, irradiation, and/or polymerization catalysts. Catalysts which have been found to be particularly useful are the monomer-soluble organic peroxides such as benzoyl peroxide, lauroyl peroxide, 2,4-dichlorobenzoyl peroxide, acetyl peroxide, acetyl benzoyl peroxide, acetyl cyclohexane sulfonyl peroxide; alkyl percarbonates; perborates; azo compounds, and mixtures thereof. When the reaction is to be effected in emulsion, the well-known "redox" type catalysts advantageously may be used. Mixtures, for example, of sodium bisulfite and potassium persulfate are suitable in conjunction with a small amount of an activating metal ion and optionally a bicarbonate buffer.

The quantity of catalyst used will be varied depending upon its activity, the quantity of monomer and economical consideration. Normally, the amount of catalyst will be chosen so as to give an overall rate of reaction of less than about ten hours. When the catalyst is of the peroxide type, an amount of about 0.01 to 3.0 per cent, preferably 0.05 to 1.0 per cent based upon the total weight of polymerizable monomers present in the reaction, will be used.

The reaction is desirably carried out in the presence of chain regulators such as chlorinated hydrocarbons, alcohols, aldehydes, etc. Suitable suspending agents that can be used are hydrophilic, macro-molecular, natural or synthetic colloids and non-ionic and ionic synthetic surfactants and mixtures thereof including polyvinyl alcohol and polyacrylic acid. Exemplary of the emulsifying agents which can be employed are the alkyl sulfates such as sodium lauryl sulfate.

Other variations of the aqueous polymerization process are also possible, such as the addition of more catalyst with the long-chain aliphatic vinyl monomer to ensure a desirable degree of conversion and rate of reaction. It is also possible to polymerize substantially all of the polymerizable monomer formulation initially introduced and then add additional polymerizable vinyl halide monomer formulation with the long-chain aliphatic vinyl monomer.

Whatever technique is used, it is essential to the present invention that the long-chain aliphatic vinyl monomer be admixed with a dispersion of a polymer of vinyl halide formed prior to introduction of the long-chain monomer. A high concentration of the long-chain aliphatic vinyl monomer is thereby achieved on the exterior of the resin particles, with a vinyl halide polymeric or interpolymeric central core essentially free of the long-chain compound. Since it is the relative incompatbility of these long-chain monomers which is believed to be responsible for the improved lubricity, concentrating the monomer, and hence the long aliphatic chains, in a shell of the resin particles greatly enhances this effect and makes maximum use of the long-chain aliphatic vinyl monomer. For this reason, when the polymer phase and the final polymeric product are prepared in consecutive steps of a single reaction cycle, it is most beneficial to introduce the long-chain vinyl monomer after a fairly large portion of the base resin has been produced.

Adding the long-chain aliphatic vinyl monomer after polymerization of a large portion of the initial vinyl halide monomer has taken place avoids the rate retardation normally experienced when copolymerizing vinyl chloride with the long-chain aliphatic monomers.

Adding the long-chain monomer at too late a point in the reaction, however, may result in residual long-chain aliphatic vinyl monomer since in many cases the reaction rate thereof is slower than that of the monomers of the polymerizable monomer formulation. All of these considerations should be borne in mind when determining the point of introduction of the long-chain compound.

Other Components in the Polymeric Product

The compositions of the invention may additionally contain additives such as stabilizers, fillers, colorants, processing aids, rubbers, etc. Furthermore, although the present compositions are generally fully within the scope of the invention to include other lubricants or processing aids. For example, small amounts of metallic stearates, methyl methacrylate polymers, may be included. The compositions can also be reinforced with inorganic materials, such as asbestos or glass fibers.

Although the modified polymers of the present invention can be employed alone, they can be blended with other polymeric materials. For example, it may be desirable to admix a quantity of the modified vinyl halide composition of the invention with a quantity of preformed vinyl halide homopolymer or copolymer. In such a case, the components may be admixed in substantially any proportion; however, it is apparent that if too little of the instant polymer product is utilized, the advantageous effects thereof will not be realized. Accordingly, the products of the present invention should be used in an amount of at least 50 per cent by weight of such a mixture.

SPECIFIC EXAMPLES

Exemplary of the efficacy of the present invention are the following specific examples wherein all parts and percentages are on a weight basis unless otherwise indicated.

EXAMPLE ONE

A series of vinyl chloride graft copolymers is prepared by first purging reaction vessels with nitrogen and then charging them with about 200 parts of distilled water containing about 0.25 part of a suspending agent about 0.20 part of a surfactant. The vessels and their contents are then cooled by chilled water while maintaining a nitrogen atmosphere, after which vinyl chloride (VC), chlorinated polyethylene (CPE) and 0.25 part of lauroyl peroxide initiator are added and the vessels sealed. The CPE is dissolved in the VC monomer prior to polymerization in each instance.

In some instances CVE is added initially with the VC and CPE, and in other instances the CVE is added only after the VC is partially polymerized (delayed addition). When the CVE is added late, it is introduced after 65 to 75 per cent conversion of the VC monomer.

The vessels are then agitated at a temperature of about 60° C., and when the desired degree of conversion is reached, the vessels are vented. After that, the reactors are cooled by chilled water and charged with cetyl vinyl ether (CVE) monomer and a quantity of vinyl chloride monomer equal to that lost by venting.

Polymerization is thereafter resumed in the resealed vessels at 60° C. for an additional period of about 16 to 20 hours to polymerize about 95 to 100 per cent of the polymerizable monomers present. The resulting polymer is filtered, washed with water and then treated with methanol or hot hexane to ensure that all unreacted cetyl vinyl ether is removed.

From the resins produced, samples are prepared by (1) mill-rolling followed by compression molding (low shear) and (2) extrusion followed by compression molding (high shear). Processed resulting samples are then tested for toughness by Izod impact tests. The samples in which 2 and 4 parts of CVE are charged initially are found to have low Izod impact values while, on the other hand, the samples to which CVE is added after initial conversion of VC monomer exhibit high Izod impact values. Such high toughness values are preserved even after high shear processing.

Results are summarized in Table I below.

TABLE I

| Identification | Percent CPE[1] by weight | Percent CVE by weight charged[1] Delayed addition | Percent CVE by weight charged[1] Charged initially | Specific viscosity[2] of resin | Izod impact (ft. bls./in.) MR[3] | Izod impact (ft. bls./in.) IM[4] |
|---|---|---|---|---|---|---|
| I | None | None | None | 0.38 | | |
| II | 7 | | | 0.45 | 6.5 | 2.5 |
| III | 7 | 1.5 | | | 15.9 | 10.8 |
| IV | 7 | 3.0 | | 0.38 | 13.4 | 13.7 |
| V | 7 | | 2.0 | 0.35 | 1.2 | 1.0 |
| VI | 7 | | 4.0 | | 0.7 | 0.5 |
| VII | 7 | 2.0 | | 0.40 | 16.7 | |
| VIII | 10 | 2.0 | | 0.34 | 18.1 | 15.1 |
| IX | 10 | 4.0 | | 0.34 | 12.5 | 5.3 |
| X | 10 | | 4.0 | 0.33 | 10.3 | 1.6 |

[1] Percentages are weight based on total weight of final blend.
[2] Measured in cyclohexanone at 25° C. (0.4 g./100 ml. of solvent).
[3] Mill-rolled for 3 minutes and compression molded.
[4] Extruded and injection molded.

EXAMPLE TWO

Specimens are prepared as in Example One substituting an ethylene/propylene copolymer rubber, an ethylene/propylene copolymer CPE mixture, and an ethylene/propylene/diene terpolymer-CPE mixture for the CPE employed therein. After forming test samples from the resulting polymers under injection molding (high shear) conditions, they are found to exhibit better toughness properties than similar products containing CPE as the only rubber.

EXAMPLE THREE

Specimens are prepared using substantially the same method described in Example One, modified only in that vinyl stearate is substituted for the CVE employed therein. Physical data developed using the resultant polymers shows that the toughness characteristics of the product specimens after high shear processing are excellent.

EXAMPLE FOUR

Specimens are prepared using substantially the same method described in Example One, modified only in that stearate acrylate is substituted for the CVE employed therein. Physical data developed using the resultant polymers shows that toughness characteristics of the product specimens after high shear processing are excellent.

What is claimed is:

1. A process for making a rubber-modified vinyl halide polymer comprising the steps of:
   A. forming an aqueous dispersion comprising water and, as reactants, (on a 100 parts by weight total basis):
      1. from about 40 to 80 parts by weight of preformed vinyl halide graft copolymer particles ranging in average cross-sectional dimension from about 0.05 to 150 microns, said polymer particles comprising (on a 100 weight per cent total basis):
         a. as a substrate from about three to 18 weight per cent of a rubber, said rubber being characterized by having a degree of unsaturation which is under about five mol per cent double bonds, as determined, for example, by the iodine monochloride titration method, a dispersability in liquid vinyl chloride monomer of at least about 3 parts by weight per 100 of vinyl chloride monomer at 50° C., and a glass phase transition temperature below about 0° C., and a superstrate consisting of polymerized vinyl halide and up to about 24 weight per cent of a copolymerized ethylenically unsaturated aliphatic monomer having a molecular weight under about 100, and
      2. from about 20 to 60 parts by weight of a monomer mixture comprising (on a 100 weight per cent total mixture basis):
         a. from about 70 to 98 weight per cent vinyl halide monomer, and
         b. the balance up to 100 weight per cent of any given such mixture being at least one long-chain aliphatic vinyl compound characterized by the general formula:

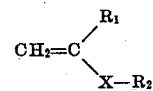

where $R_1$ is hydrogen or methyl, $R_2$ is an aliphatic radical containing from eight through 22 carbons, and

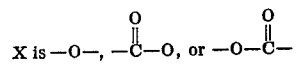

B. subjecting said aqueous dispersion to polymerization conditions for a period of time sufficient to polymerize at least a substantial portion of the polymerizable monomers present therein, and C. recovering the resulting polymeric product.

2. The process of claim 1 wherein said vinyl halide polymer particles comprise a graft copolymer of vinyl chloride on chlorinated polyethylene.

3. The process of claim 1 wherein said long-chain aliphatic vinyl monomer is characterized by the general formula:

$$CH_2=CH-O-R$$

where R is an aliphatic radical containing from about eight to 22 carbon atoms.

4. The process of claim 1 wherein said long-chain aliphatic vinyl monomer is characterized by the general formula:

$$CH_2=\overset{H}{\underset{|}{C}}-O-\overset{O}{\underset{\|}{C}}-R_3$$

where R is an aliphatic radical containing from about eight to 22 carbon atoms.

5. The process of claim 1 wherein said long-chain aliphatic vinyl monomer is characterized by the general formula:

$$CH_2=\overset{R_1}{\underset{|}{C}}-\overset{O}{\underset{\|}{C}}-O-R$$

where R is an aliphatic radical containing from about 8 to 22 carbon atoms and $R_1$ is hydrogen or methyl.

6. The process of claim 1 wherein said long-chain aliphatic vinyl monomer is cetyl vinyl ether.

7. The product produced by the process of claim 1 wherein said long-chain aliphatic vinyl monomer is characterized by the general formula:

$$CH_2=CH-O-R$$

where R is an aliphatic radical containing from about eight to 22 carbon atoms.

8. The product produced by the process of claim 1 wherein said long-chain aliphatic vinyl monomer is characterized by the general formula:

$$CH_2=\overset{H}{\underset{|}{C}}-O-\overset{O}{\underset{\|}{C}}-R_3$$

where R is an aliphatic radical containing from about eight to 22 carbon atoms.

9. The product produced by the process of claim 1 wherein said long-chain aliphatic vinyl monomer is characterized by the general formula:

$$CH_2=\overset{R_1}{\underset{|}{C}}-\overset{O}{\underset{\|}{C}}-O-R$$

where R is an aliphatic radical containing from about eight to 22 carbon atoms and $R_1$ is hydrogen or methyl.

10. The product produced by the process of claim 1 wherein said long-chain aliphatic vinyl monomer is cetyl vinyl ether.

* * * * *